United States Patent [19]
Kaneda

[11] Patent Number: 6,070,016
[45] Date of Patent: May 30, 2000

[54] LENS CONTROL DEVICE

[75] Inventor: Naoya Kaneda, Chigasaki, Japan

[73] Assignee: Canon Kabushiki Kaisha, Tokyo, Japan

[21] Appl. No.: 09/209,203

[22] Filed: Dec. 10, 1998

[30] Foreign Application Priority Data

Dec. 22, 1997 [JP] Japan ..................................... 9-364756

[51] Int. Cl.⁷ .............................. G03B 7/00; G03B 17/00
[52] U.S. Cl. ................................. 396/64; 396/86; 396/257
[58] Field of Search ................................. 396/64, 86, 85, 396/257, 63; 359/696, 697, 698; 348/358, 363, 364, 365, 362

[56] References Cited

U.S. PATENT DOCUMENTS

| | | | |
|---|---|---|---|
| 4,141,636 | 2/1979 | Shimojima | 396/63 |
| 5,146,259 | 9/1992 | Kobayashi et al. | 396/64 |
| 5,278,605 | 1/1994 | Satoh | 396/63 |

*Primary Examiner*—W. B. Perkey
*Attorney, Agent, or Firm*—Robin, Blecker & Daley

[57] ABSTRACT

A lens control device which uses a zoom lens in which the state of marginal light quantity varies according to each focal length is arranged to compensate for a variation in marginal light quantity during zooming by detecting the focal length and controlling a maximum aperture diameter of an iris.

15 Claims, 13 Drawing Sheets

| AMOUNT OF DEPRESSION OF SWITCH | FIRST STEP | SECOND STEP | THIRD STEP | FOURTH STEP |
|---|---|---|---|---|
| NORMAL SPEED SETTING | 30 SECONDS | 10 SECONDS | 5 SECONDS | 2 SECONDS |
| COUNTERMEASURE SPEED SETTING | 30 SECONDS | 15 SECONDS | 8 SECONDS | 5 SECONDS |

LENS CONTROL DEVICE

BACKGROUND OF THE INVENTION

1. Field of the Invention

The present invention relates to a lens control device suitable for use in an image pickup apparatus such as a video camera.

2. Description of Related Art

Conventionally, an image pickup apparatus such as a video camera has an image sensor using a solid-state image pickup element such as a CCD, in its image forming plane. In general, the larger the number of pixels per image pickup element such as a CCD, the larger the size of the image pickup element and hence the higher the cost of the same.

In terms of these considerations, numerous image pickup apparatuses for general domestic use employ a so-called ¼-inch size CCD which is approximately 4 mm in diagonal length or a so-called ⅓-inch size CCD which is approximately 6 mm in diagonal length. These CCDs generally have 300,000 to 400,000 pixels.

Since the image size of such image pickup apparatus is small compared to 43 mm which is the diagonal length of the image size of a silver-halide camera using a so-called 135 film, it is possible to greatly reduce the size of a lens for the image pickup apparatus compared to the lens of the silver-halide camera if both lenses have the same angle of view.

In practice, video cameras using ¼-inch size CCDs are generally provided with zoom lenses having a zoom ratio of 10 and an overall length of approximately 50 mm.

A best known type of zoom lens for such a video camera includes four lens groups which are arranged in the order of positive refractive power, negative refractive power, positive refractive power and positive refractive power as viewed from a subject side. Incidentally, zoom lenses of various other types using different lens-group arrangements have been put into practice to meet various specifications.

First of all, for example, the structure of the lens barrel of a representative zoom lens which includes four lens groups will be described below. Four lens groups constituting a zoom lens include a fixed front lens, a variator lens group which moves along an optical axis to effect a magnification varying operation, a fixed afocal lens, and a focusing lens group which moves along the optical axis to effect a focusing operation and maintain the position of a focal plane during a magnification varying operation.

FIG. 15 is a block diagram showing the electrical construction of the camera body of a conventional image pickup apparatus. In FIG. 15, a zoom lens includes four lens groups 201a to 201d. The lens group 201a constitutes a fixed front lens, the lens group 201b constitutes a variator lens group (or variator) which varies magnification, the lens group 201c constitutes a fixed afocal lens, and the lens group 201d constitutes a focusing lens group which effects focusing and also plays the role of a compensator for maintaining an image of a subject located at the same distance, in an in-focus state in an image forming plane during a magnification varying operation accompanied by the movement of the variator lens group 201b.

A solid-state image pickup element 221 such as a CCD is disposed in the image forming plane. A drive source 222 for the variator lens group 201b includes the motor 206, the gear train 207 interlocked with the motor 206, the screw rod 208 and the like. A drive source 223 for the focusing lens group 201d is composed of a stepping motor 212 or the like. Incidentally, the zoom driving source 222 may also be composed of a stepping motor similarly to the drive source 223 for the focusing lens group 201d.

Reference numeral 224 denotes an iris driving source, reference numeral 225 denotes a zoom encoder, and reference numeral 227 denotes a focus encoder. If stepping motors are used as the respective drive sources 222 and 223, each of the zoom encoder 225 and the focus encoder 227 is generally arranged to continuously count the number of operation pulses which are inputted to the corresponding one of the stepping motors after the corresponding lens group 201b or 201d starts to move from its origin position to which the lens group 201b or 201d is previously moved at an initial preparatory stage of operation by means of a sensor (not shown). Another method using a potentiometer, a magnetic system or the like is also known.

An iris encoder 226 is, for example, of a known type which detects the relation in rotational position between a rotor and a stator by means of a Hall element disposed in a meter which constitutes the iris driving source 224.

A camera signal processing circuit 228 applies predetermined processing such as amplification and gamma correction to the output of the CCD 221. The contrast signal of a video signal subjected to such predetermined processing passes through an AE gate 229 and an AF gate 230. Specifically, areas from which to extract signals best suited to exposure decision and distance measurement are set within the entire picture by the respective gates 229 and 230. Each of the gates 229 and 230 may be variable in the size of the area from which to extract the corresponding signal, or a plurality of gates may be disposed to constitute either of the gates 229 and 230, but the detailed description of such a gate is herein omitted for the sake of simplicity.

An AF (autofocus) signal processing circuit 231 generates one or a plurality of outputs relative to a high-frequency component of the video signal. Reference numeral 233 denotes a zoom switch, and reference numeral 234 denotes a zoom tracking memory. The zoom tracking memory 234 stores position information indicative of positions to be taken by the focusing lens group 201d according to different subject distances during a magnification varying operation. Incidentally, a memory incorporated in a CPU 232 may be used as the zoom tracking memory 234.

For example, if a photographer manipulates the zoom switch 233, the CPU 232 calculates a predetermined positional relation on the basis of the information stored in the zoom tracking memory 234, and drives and controls the zoom driving source 222 and the focusing driving source 223 so that the deviation of the output of the zoom encoder 225 from a target position to be taken by the variator lens group 201b and the deviation of the output of the focus encoder 227 from a target position to be taken by the focusing lens group 201d are made values of 0, respectively, so as to retain the predetermined positional relation.

In an autofocus operation, the CPU 232 drives and controls the focusing driving source 223 so that the output of the AF signal processing circuit 231 shows a peak.

Furthermore, to obtain a correct exposure, the CPU 232 drives and controls the iris driving source 224 so that the deviation of an average value of Y-signal outputs passing through the AE gate 229 from a predetermined value is made a value of 0 so that the average value of Y-signal outputs passing through the AE gate 229 becomes equal to the predetermined value.

FIG. 16 is a graph showing the field illumination ratio of the zoom lens. In FIG. 16, the horizontal axis represents image height, and the position of a value of 0 indicates the optical axis of the zoom lens (a position corresponding to an image height of 0). The vertical axis represents field illumination ratio, and the field illumination ratio on the optical axis is 100.

Curves 238, 239 and 240 represent specific characteristic examples, and any of the specific characteristic examples shows that the illumination in general becomes lower toward the margin of the picture (as the image height becomes higher). For zoom lenses, it is desirable that such illumination characteristic be approximately constant for any focal length.

However, if the iris of a zoom lens having a large zoom ratio is fully open, the illumination characteristic is difficult to keep constant and may vary according to the focal length of the zoom lens, for example, as shown by the characteristic 238 relative to a shortest focal length end, the characteristic 239 relative to a middle focal length and the characteristic 240 relative to a longest focal length end. Furthermore, the illumination characteristic varies according to the aperture value of the iris (the amount of variation is largest when the iris is fully open).

A zooming operation is performed in accordance with the manipulation of the zoom switch 233, and many image pickup apparatuses are arranged to perform zooming operation at variable speeds. It is well known that an image pickup apparatus using, for example, a seesaw switch as a zoom switch is arranged to detect the amount of depression of the seesaw switch by means of a sensor and execute zooming at a lower speed in response to a smaller amount of depression or at a higher speed in response to a larger amount of depression.

Some of the cameras of the above-described type as well as known still cameras have a so-called "mode select" function capable of variably combining shutter speeds and aperture values during photography. A photographer using such a camera may specify the desired photographic intention in accordance with the instruction of a pictorial icon so that, for example, an image shake can be prevented as completely as possible by using a high shutter speed during sports photography or a depth of field can be made as shallow as possible to defocus a background during portrait photography.

Another method called "aperture-priority AE" is known. In this method, a photographer manually sets an aperture value, and a shutter speed which can realize a correct exposure with the aperture value is automatically selected. If the aperture of an iris is generally reduced, a background or a foreground, particularly, bright spots are each defocused in a shape which reflects a polygon defined by the number of blades, such as a square, a hexagon or an octagon, whereas if the aperture of the iris is fully open, the bright spots are each defocused in a circular shape. Accordingly, if the photographer has a photographic intention to create such circular defocused spot images, the photographer needs only to set the aperture to a fully open aperture value in an aperture-priority AE mode.

However, the above-described type of image pickup apparatus has the following problems which have been desired to be improved. Specifically, with the recent improvement in the operating speeds of stepping motors or owing to the adoption of a lens group driving source which uses an electromagnetic type of actuator, called a linear motor, which can effect high-speed driving of a so-called voice coil type, the maximum zoom speed of the image pickup apparatus has been enhanced, and the time required to drive a variator lens group from a shortest (longest) focal length end to a longest (shortest) focal length end has been greatly reduced. As a result, if the field illumination ratio varies as shown in FIG. 16, particularly when high-speed zooming is executed with an aperture value which causes a large variation in the field illumination ratio, a variation in the brightness of a marginal portion of a picture becomes conspicuous, so that visual unnaturalness occurs.

BRIEF SUMMARY OF THE INVENTION

An object of the present invention is to provide a lens control method and device both of which can avoid the problem that a variation in the brightness of a marginal portion of a picture becomes conspicuous and visual unnaturalness occurs, even when high-speed zooming is executed with an aperture value which causes a large variation in field illumination ratio.

To achieve the above object, according to a preferred embodiment of the present invention, there is provided a lens control device which is arranged to execute zooming by moving a lens in the direction of an optical axis thereof and comprises speed setting means for setting a moving speed of the lens, and maximum aperture diameter varying means for varying a maximum aperture diameter of an iris which is determined for each focal length, according to the moving speed set by the speed setting means.

Another object of the present invention is to provide a lens control device capable of effecting good zooming at any time irrespective of the kind of photographing mode or the state of a subject.

Another object of the present invention is to provide a lens control device capable of effecting good zooming which does not visually impair an image, at all times irrespective of the kind of lens unit, even in the case of an interchangeable lens system which includes a plurality of interchangeable lens units having respective different characteristics.

The above and other objects, features and advantages of the present invention will become apparent from the following detailed description of preferred embodiments of the present invention, taken in conjunction with the accompanying drawings.

DETAILED DESCRIPTION OF THE INVENTION

Preferred embodiments of the present invention will be described below in detail with reference to the accompanying drawings.

Embodiments of a lens control device and a lens control method according to the present invention will be described below. There are two major countermeasures to be taken against a variation in marginal light quantity which occurs during high-speed zooming, particularly when an iris is fully open. One countermeasure is to slow down zooming speed so that such phenomenon becomes inconspicuous. Third, fourth and seventh embodiments which will be described later are based on this concept.

The other countermeasure, which is based on the fact that a variation in marginal light quantity is reduced when the aperture of an iris is reduced, is to make a settable maximum iris aperture diameter variable according to different focal lengths. First, second, fifth, sixth and eighth embodiments which will be described later are based on this concept.

[First Embodiment]

Figure 1:
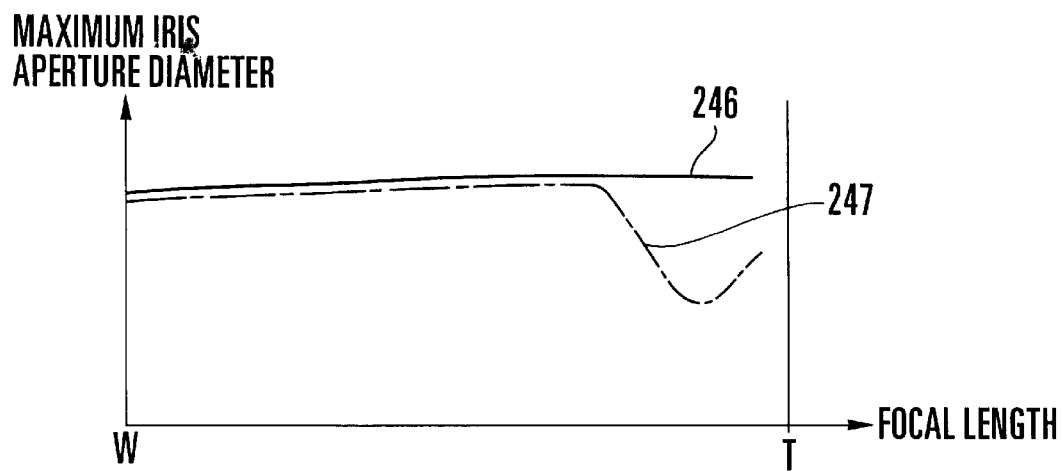
FIG. 1 is a graph showing the characteristics of a maximum iris aperture diameter with respect to focal lengths.

First of all, the latter countermeasure, i.e., variable control which varies the maximum iris aperture diameter according to different focal lengths will be described below. FIG. 1 is a graph showing characteristics of the maximum iris aperture diameter with respect to different focal lengths. In FIG. 1, the horizontal axis represents focal length, and the vertical axis represents maximum iris aperture diameter. A solid line 246 represents a characteristic obtainable when the maximum iris aperture diameter is not subjected to variable control according to different focal lengths, while a dot-dashed line 247 represents a characteristic obtainable when the maximum iris aperture diameter is subjected to variable control according to different focal lengths.

Figure 2:
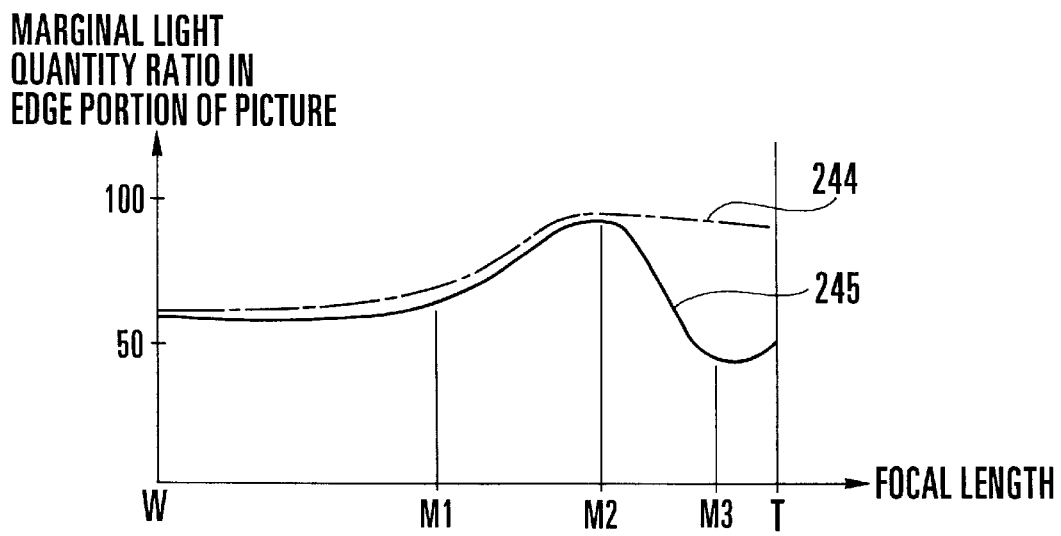
FIG. 2 is a graph showing the characteristics of a marginal light quantity ratio which appears in an edge portion of a picture with respect to focal lengths.

FIG. 2 is a graph showing the characteristics of a marginal light quality ratio which appears in the edge portion of a picture with respect to different focal lengths. In FIG. 2, the horizontal axis represents focal length similarly to FIG. 1, and the vertical axis represents the evaluation of marginal light quantity, i.e., the ratio of marginal light quantity to central light quantity (i.e., the marginal light quantity ratio) at the position of an image height which corresponds to the edge portion of a picture (for example, an image height of 2 mm in an image pickup apparatus using an ¼-inch CCD). If the maximum iris aperture diameter is not subjected to variable control according to focal lengths as shown by the solid line 246 in FIG. 1, a large variation occurs in marginal light quantity, as shown by a solid line 245 in FIG. 2.

Specifically, in the example shown by the solid line 245, almost no variation in marginal light quantity almost occurs between W (shortest focal length end) and a focal length M1. The marginal light quantity moderately varies between the focal length M1 and a focal length M2, and between the focal length M2 and a focal length M3, the direction of variation changes and the marginal light quantity varies somewhat sharply. Then, the direction of variation again changes between the focal length M3 and T (longer focal length end).

In contrast, if the maximum iris aperture diameter is subjected to variable control according to focal lengths as shown by the dot-dashed line 247 in FIG. 1, the variation between the focal lengths M2 and T can be eliminated as shown by the dot-dashed line 244 in FIG. 2, whereby the marginal light quantity ratio in the edge portion can be made uniform over the entire focal length range.

The structure of the lens barrel of a zoom lens of an image pickup apparatus according to the first embodiment of the present invention will be described below.

Figure 3A:
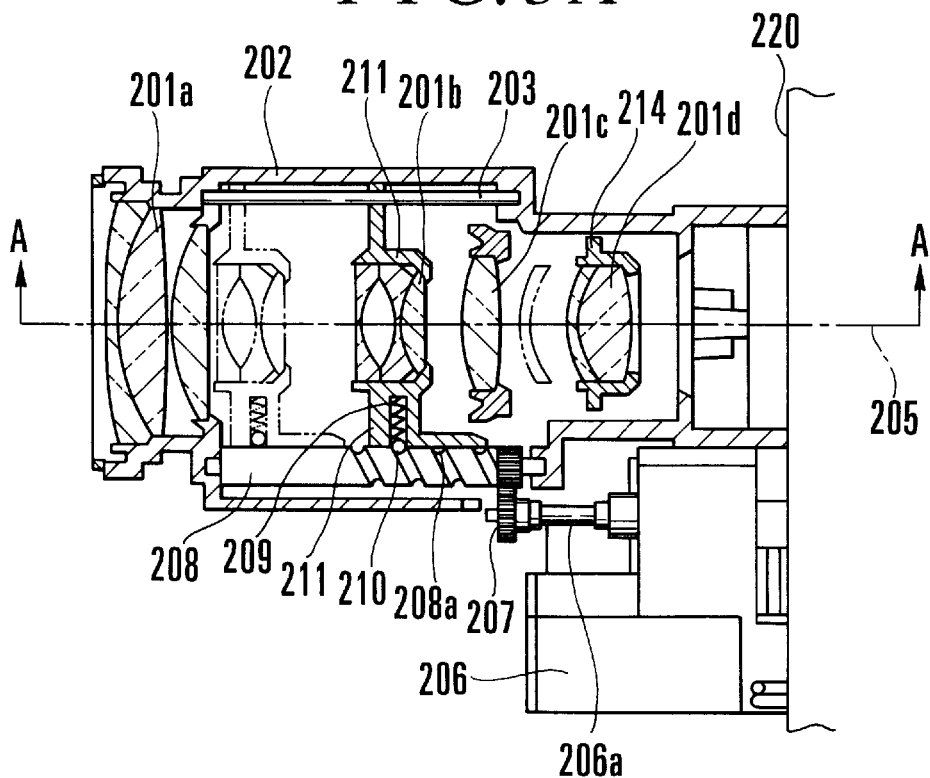
FIGS. 3A and 3B are cross-sectional views showing the structure of the lens barrel of a zoom lens which includes four lens groups according to a first embodiment of the present invention.
Figure 3B:
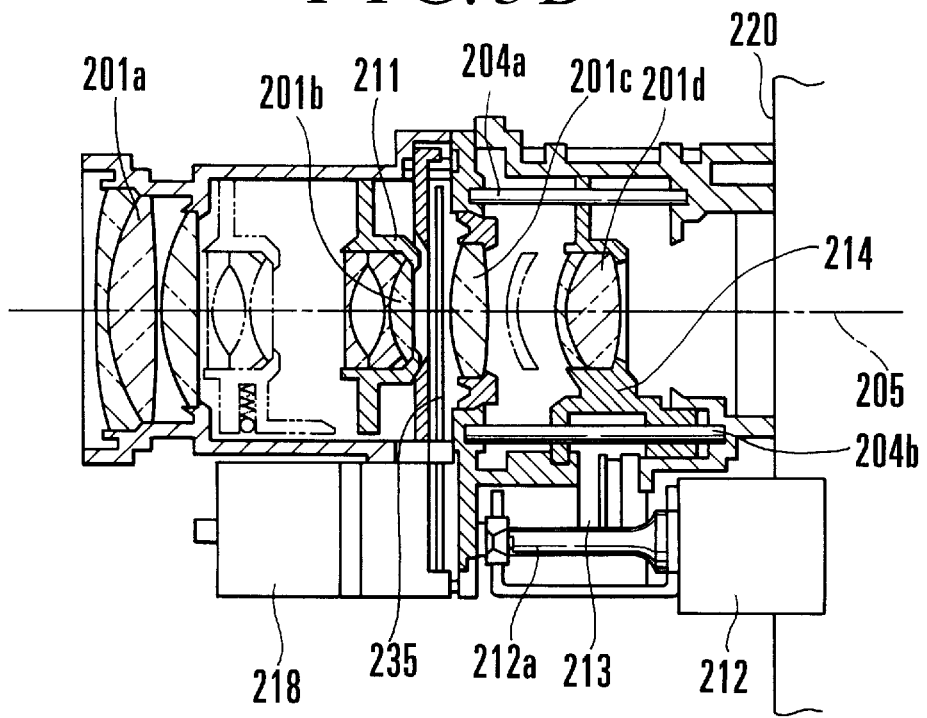

FIGS. 3A and 3B are cross-sectional views showing the structure of the lens barrel of the zoom lens which includes four lens groups according to the first embodiment. FIG. 3A shows a vertical sectional, while FIG. 3B shows a cross-section taken along line A—A of FIG. 3A. In the structure shown in FIGS. 3A and 3B, four lens groups 201a to 201d constitute a photographing zoom lens, and the lens group 201a constitutes a fixed front lens, the lens group 201b constitutes a variator lens group which moves along an optical axis 205 to effect a magnification varying operation, the lens group 201c constitutes a fixed afocal lens, and the lens group 201d constitutes a focusing lens group which moves along the optical axis 205 to effect a focusing operation and maintain the position of a focal plane during a magnification varying operation.

Guide bars 203 and 204a, 204b are disposed in parallel with the optical axis 205 to guide the respective lens groups 201b and 201d while preventing their rotations during their movements. A DC motor 206 serves as a drive source for moving the variator lens group 201b. The DC motor 206 may also be replaced with a stepping motor.

The variator lens group 201b is held by a holding frame 211. This holding frame 211 has a pressure spring 209 and a ball 210 which is brought into engagement with a screw groove 208a formed around a screw rod 208, by the force of the pressure spring 209. As the screw rod 208 is rotationally driven by the DC motor 206 via an output shaft 206a and a gear train 207, the holding frame 211 is moved along the guide bar 203 in the direction of the optical axis 205.

A motor 212 is a stepping motor, and the focusing lens group 201d is held by a holding frame 214. A screw member 213 is integrally secured to a sleeve portion of the holding frame 214, and the screw member 213 can move the holding frame 214 along the guide bars 204a and 204b in the direction of the optical axis 205 during the rotation of the stepping motor 212.

An IG meter 218 drives an iris unit 235, and the zoom lens barrel is secured to a camera body 220.

Figure 4:
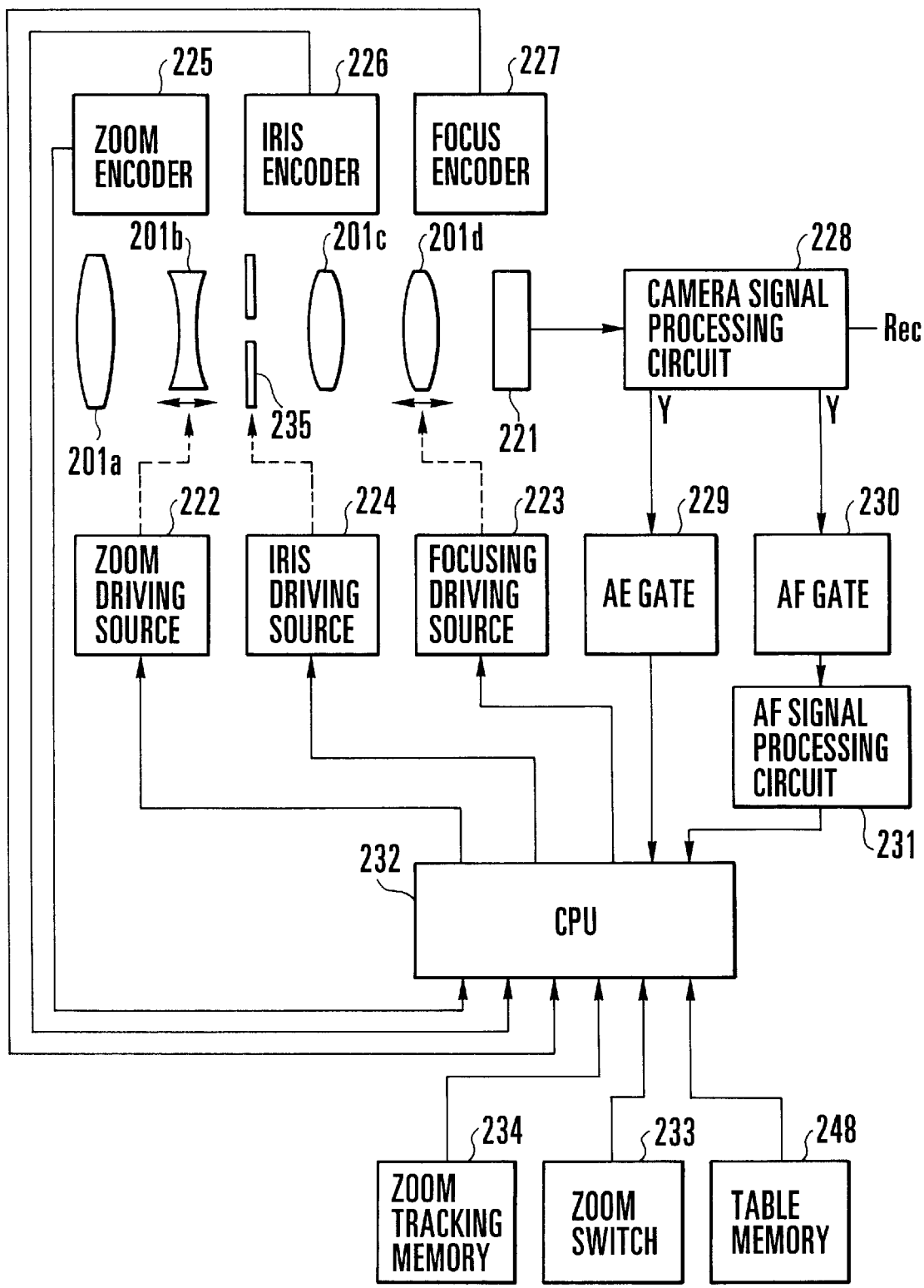
FIG. 4 is a block diagram showing the electrical construction of a camera body according to the first embodiment of the present invention.

The electrical construction of the camera body 220 having the above-described lens barrel structure will be described below. FIG. 4 is a block diagram showing the electrical construction of the camera body 220. A block 248 which is newly added in the above-described construction shown in FIGS. 3A and 3B is a table memory in which information indicative of maximum iris aperture diameters according to focal lengths is set in the form of a table. In FIG. 4, identical reference numerals are used to denote constituent elements identical to the corresponding ones shown in FIGS. 3A and 3B.

The four lens groups 201a to 201d shown in FIG. 4 correspond to the respective ones 201a to 201d shown in FIGS. 3A and 3B. The lens group 201b constitutes a variator lens group (or variator) which varies magnification, and the lens group 201d constitutes a focusing lens group which effects focusing and also plays the role of a compensator for maintaining an image of a subject located at the same distance, in an in-focus state in an image forming plane during a magnification varying operation accompanied by the movement of the variator lens group 201b.

A solid-state image pickup element 221 such as a CCD is disposed in the image forming plane. A drive source 222 for the variator lens group 201b includes the motor 206, the gear train 207 interlocked with the motor 206, the screw rod 208 and the like. A drive source 223 for the focusing lens group 201d is composed of a stepping motor 212 or the like. Incidentally, the zoom driving source 222 may also be composed of a stepping motor similarly to the drive source 223 for the focusing lens group 201d.

Reference numeral 224 denotes an iris driving source, reference numeral 225 denotes a zoom encoder, and reference numeral 227 denotes a focus encoder. If stepping motors are used as the respective drive sources 222 and 223, each of the zoom encoder 225 and the focus encoder 227 is generally arranged to continuously count the number of operation pulses which are inputted to the corresponding one of the stepping motors after the corresponding lens group 201b or 201d starts to move from its origin position to which the lens group 201b or 201d is previously moved at an initial preparatory stage of operation by means of a sensor (not shown). Another method using a potentiometer, a magnetic system or the like is also known.

An iris encoder 226 is, for example, of a known type which detects the relation in rotational position between a rotor and a stator by means of a Hall element disposed in a meter which constitutes the iris driving source 224.

A camera signal processing circuit 228 applies predetermined processing such as amplification and gamma correction to the output of the CCD 221. The contrast signal of a video signal subjected to such predetermined processing passes through an AE gate 229 and an AF gate 230. Specifically, areas from which to extract signals best suited to exposure decision and distance measurement are set within the entire picture by the respective gates 229 and 230. Each of the gates 229 and 230 may be variable in the size of the area from which to extract the corresponding signal, or a plurality of gates may be disposed to constitute either of the gates 229 and 230, but the detailed description of such a gate is herein omitted for the sake of simplicity.

An AF (autofocus) signal processing circuit 231 generates one or a plurality of outputs relative to a high-frequency component of the video signal. Reference numeral 233 denotes a zoom switch, and reference numeral 234 denotes a zoom tracking memory. The zoom tracking memory 234 stores position information indicative of positions to be taken by the focusing lens group 201d according to different subject distances during a magnification varying operation. Incidentally, a memory incorporated in a CPU 232 may be used as the zoom tracking memory 234.

For example, if a photographer manipulates the zoom switch 233, the CPU 232 calculates a predetermined positional relation on the basis of the information stored in the zoom tracking memory 234, and drives and controls the zoom driving source 222 and the focusing driving source 223 so that the deviation of the output of the zoom encoder 225 from a target position to be taken by the variator lens group 201b and the deviation of the output of the focus encoder 227 from a target position to be taken by the focusing lens group 201d are made values of 0, respectively, so as to retain the predetermined positional relation.

In an autofocus operation, the CPU 232 drives and controls the focusing driving source so that the output of the AF signal processing circuit 231 shows a peak.

Furthermore, to obtain a correct exposure, the CPU 232 drives and controls the iris driving source 224 so that the deviation of an average value of Y-signal outputs passing through the AE gate 229 from a predetermined value is made a value of 0 so that the average value of Y-signal outputs passing through the AE gate 229 becomes equal to the predetermined value.

In the first embodiment, when the photographer performs a zoom manipulation, a detection is made as to a zoom speed determined by the zoom manipulation, and it is determined whether the detected zoom speed is higher than a speed setting according to which a variation in marginal light quantity becomes conspicuous. If the detected zoom speed is higher than such speed setting, i.e., a variation in marginal light quantity is conspicuous, variable control which varies the maximum iris aperture diameter according to focal lengths is turned on.

Figure 5:
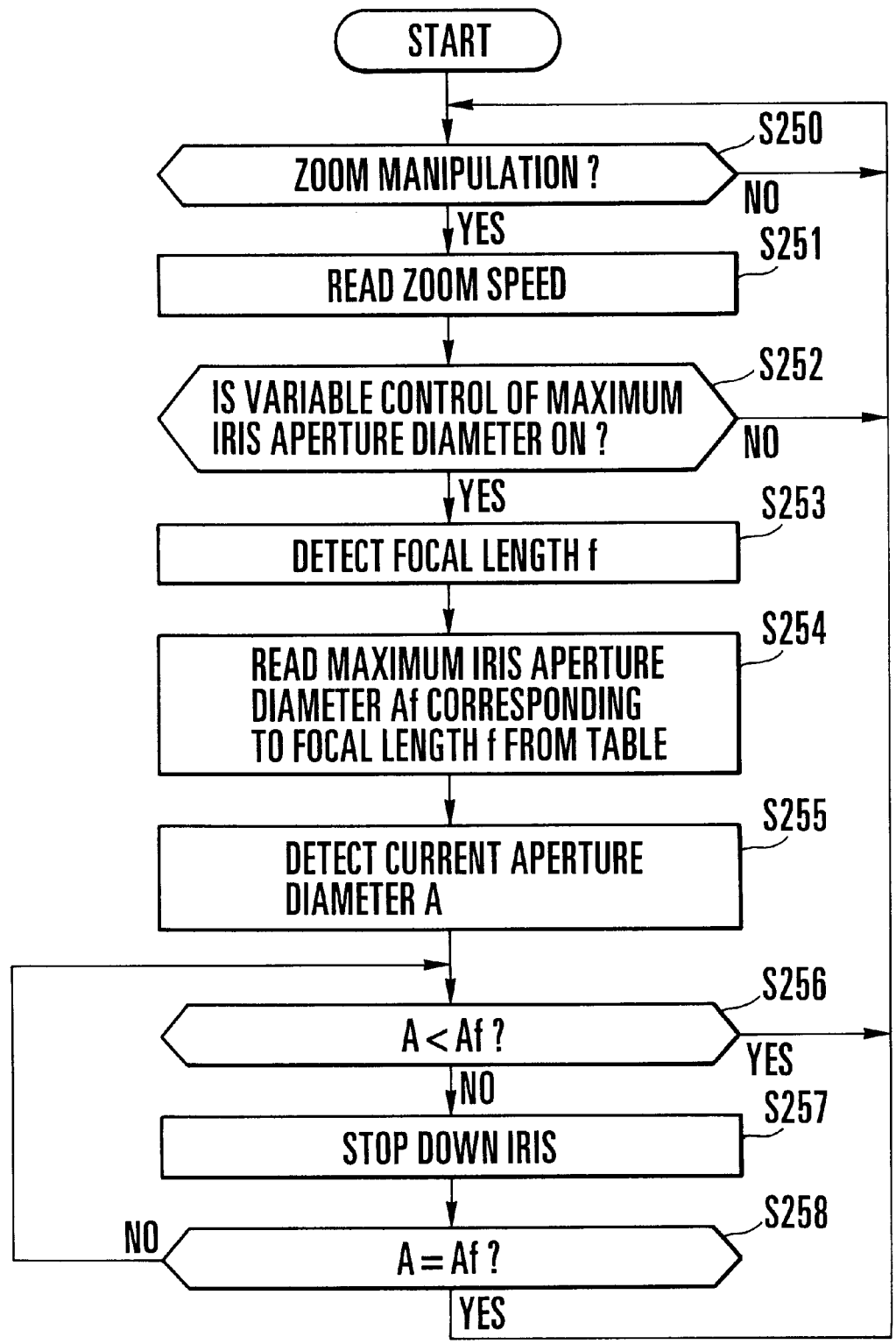
FIG. 5 is a flowchart showing a zoom control processing procedure according to the first embodiment of the present invention.

FIG. 5 is a flowchart showing a zoom control processing procedure according to the first embodiment. This zoom control processing program is stored in a ROM included in the CPU 232, and is executed by the CPU 232. First, it is determined whether a zoom manipulation is being performed (Step S250). Zoom speed information which is determined by the amount of depression of the seesaw switch (zoom switch) 233 is read in (Step S251), and it is determined whether to turn on the variable control which varies the maximum iris aperture diameter according to focal lengths, by using a method of comparing the read zoom speed information with a threshold (Step S252). The threshold to be compared with the read zoom speed information in Step S252 is determined on the basis of a zoom speed according to which visual unnaturalness in which a variation in marginal light quantity is conspicuous is produced if a zoom manipulation is performed when a marginal light quantity ratio appears in the edge portion of a picture with respect to different focal lengths, as shown by the solid line 245 in FIG. 2.

Incidentally, instead of determining whether to turn on the variable control over the maximum iris aperture diameter in Step S252, control characteristics for different zoom speed settings, such as that shown by the dot-dashed line 247 in FIG. 1, may be prepared in advance so that a predetermined control characteristic can be read out according to each individual zoom speed setting.

If it is determined in Step S252 that the variable control over the maximum iris aperture diameter does not need to be turned on, the process returns to Step S250. If it is determined in Step S252 that the variable control over the maximum iris aperture diameter needs to be turned on, a current focal length f is detected (Step S253), and a maximum iris aperture diameter Af to be determined is read from the table stored in the table memory 248 (Step S254). Incidentally, the maximum iris aperture diameter Af may also be calculated by an expression of Af=f(f) instead of being read from the table.

A current aperture diameter A is detected (Step S255), and it is determined whether the current aperture diameter A is smaller than the maximum iris aperture diameter Af (Step S256). If the current aperture diameter A is equal to or greater than the maximum iris aperture diameter Af, an iris is controlled so that the current aperture diameter A and the maximum iris aperture diameter Af are made equal to each other (Step S257). Specifically, with respect to this zoom speed, the iris is controlled so that its aperture diameter does not become larger than the maximum iris aperture diameter Af based on the focal length f.

On the other hand, if it is determined in Step S256 that the current aperture diameter A is smaller than the maximum iris aperture diameter Af, it is desirable to obtain an optimum exposure by increasing a gain for amplifying the signal of the CCD 221, when the picture is in an underexposed state.

In the above-described manner, in the first embodiment, when the zoom switch 233 is manipulated, a zoom speed determined by the amount of depression of the zoom switch 233 or the like is detected, and it is determined from the detection result whether the detected zoom speed is higher than a speed setting according to which a variation in marginal light quantity becomes conspicuous. If the detected zoom speed is higher than such speed setting, the aperture diameter of the iris is limited so that such variation becomes inconspicuous. Specifically, according to the focal length (position information relative to the variator lens group 201b), the CPU 232 limits the maximum iris aperture diameter on the basis of table data or the like which is set in the table memory 248.

Thus, even if high-speed zooming is performed with an aperture value causes a large variation in field illumination ratio, it is possible to avoid the problem that a variation in the brightness of the edge portion of the picture becomes conspicuous to produce visual unnaturalness.

[Second Embodiment]

In the first embodiment, whether to turn on the variable control which varies the maximum iris aperture diameter according to focal lengths is determined according to zoom speeds, but in the second embodiment, such on/off decision is made on the basis of the state of selection of a mode selecting switch. In particular, the second embodiment is effective in ensuring the previously-described circular defocused spot images by turning off the variable control when a fully open aperture is selected during an aperture-priority AE mode.

Figure 6:
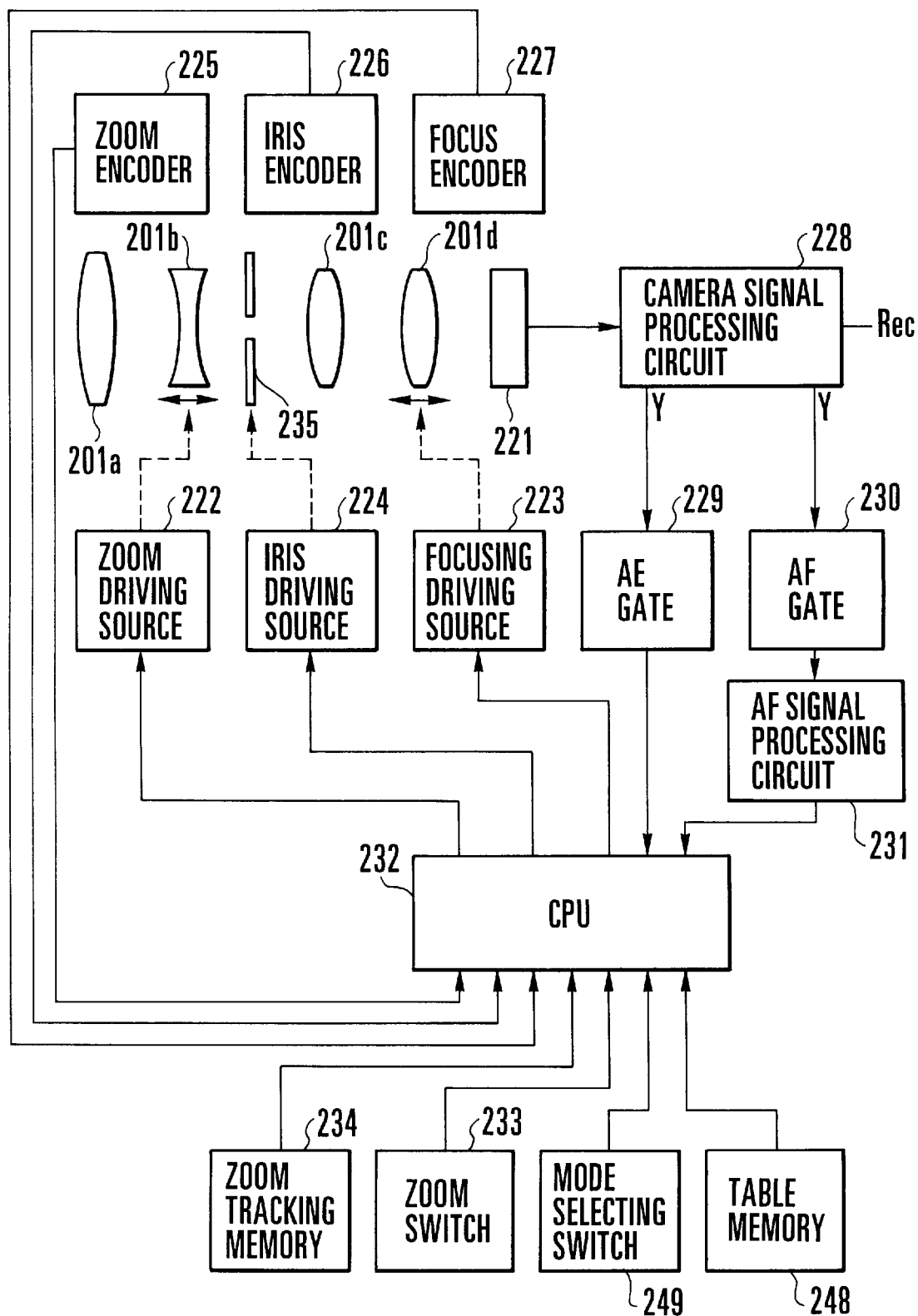
FIG. 6 is a block diagram showing the electrical construction of an image pickup apparatus according to a second embodiment of the present invention.

FIG. 6 is a block diagram showing the electrical construction of an image pickup apparatus according to the second embodiment. In FIG. 6, identical reference numerals are used to denote constituent elements identical to those used in the above-described first embodiment, and the description of such constituent elements is omitted for the sake of simplicity. Unlike the first embodiment, in the second embodiment, a mode selecting switch 249 is added. This mode selecting switch 249 is connected to the CPU 232, and serves to turn off the variable control which varies the maximum iris aperture diameter according to focal lengths, when the aperture-priority AE mode or the like is selected.

Figure 7:
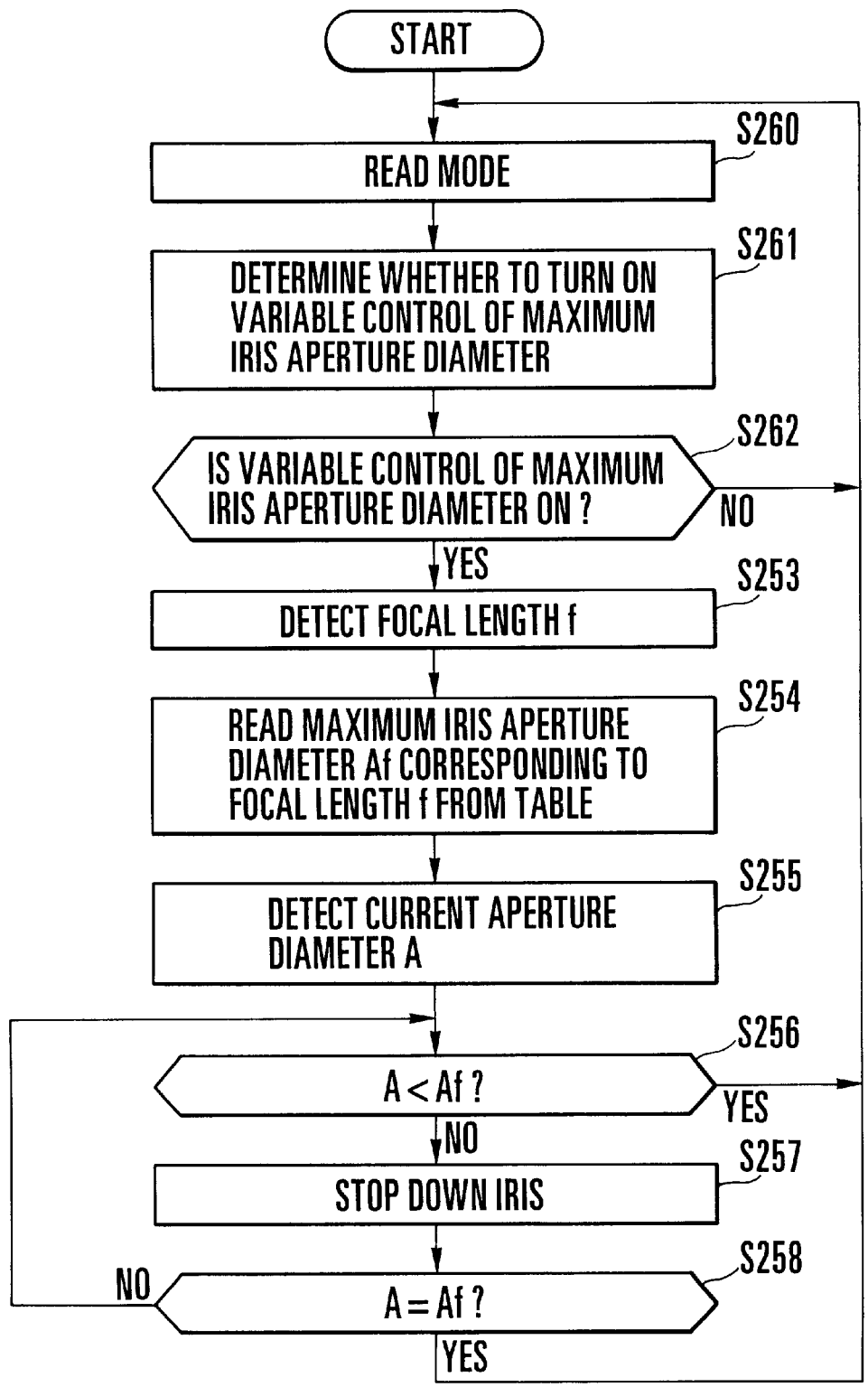
FIG. 7 is a flowchart showing a zoom control processing procedure according to the second embodiment of the present invention.

FIG. 7 is a flowchart showing a zoom control processing procedure according to the second embodiment. In FIG. 7, step numbers are used to denote steps identical to those of the first embodiment shown in FIG. 5, and the description of such steps is omitted for the sake of simplicity.

First, the CPU 232 reads a selected mode from the mode selecting switch 249 (Step S260). The CPU 232 determines whether to turn on the variable control over the maximum iris aperture diameter according to the read mode (Step S261). For example, if the read mode is the aperture-priority AE mode, the CPU 232 determines that the variable control over the maximum iris aperture diameter needs to be turned off. The CPU 232 determines whether the variable control over the maximum iris aperture diameter is on (step S262). If it is determined that the variable control is off, the process returns to Step S260, whereas if it is determined that the variable control is on, the CPU 232 executes Step S253 and the following steps identical to those of the first embodiment described previously.

Incidentally, it is theoretically possible to turn on the variable control over the maximum iris aperture diameter during various modes, and the kind of mode is not limited to a particular one.

In the above-described manner, the second embodiment selectively executes two modes according to the state of selection of the mode selecting switch 249, one for executing the variable control which varies the maximum iris aperture diameter according to focal lengths and the other for executing no variable control. Specifically, if the fully open aperture is fixed during the aperture-priority AE mode, the variable control is turned off. Accordingly, a photographer who desires to make background spot images circular can realize his/her photographic intention by selecting the aperture-priority AE mode and setting the fully open aperture.

[Third Embodiment]

In each of the image pickup apparatuses according to the first and second embodiments, it is determined according to various conditions whether to execute a countermeasure for reducing a variation in marginal light quantity by executing the variable control which varies the maximum iris aperture diameter according to focal lengths.

The third embodiment is intended to, instead of switching on/off such variable control, set a maximum zoom speed to a slow speed if the iris is set to an aperture value which causes a variation in marginal light quantity to become conspicuous when the zoom speed of the zoom lens is high.

Figures 8, 9:
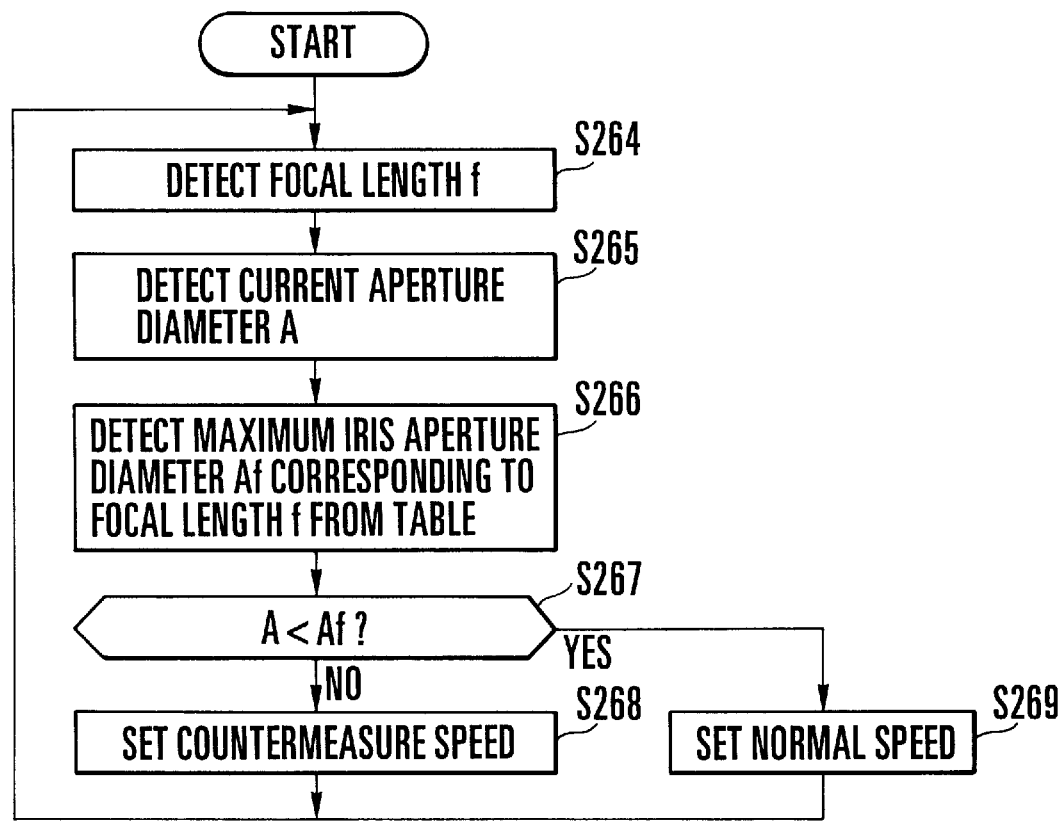
FIG. 8 is a flowchart showing a zoom control processing procedure according to a third embodiment of the present invention.
FIG. 9 is a table showing the set values of normal speed and those of countermeasure speed.

The electrical construction of an image pickup apparatus according to the third embodiment is identical to that described previously in connection with the first embodiment. FIG. 8 is a flowchart showing a zoom control processing procedure according to the third embodiment.

First, the CPU 232 detects the focal length f (Step S264). Then, the CPU 232 detects the current aperture diameter A (Step S265), and detects the maximum iris aperture diameter Af which causes a variation in marginal light quantity to become conspicuous, from the table memory 248 (Step S266). Incidentally, as stated previously, the maximum iris aperture diameter Af may be obtained by computation instead of being detected from the table stored in the table memory 248. This maximum iris aperture diameter Af may also be uniformly set to an aperture diameter which is stopped down by approximately two steps from the fully open aperture, as required, in terms of a safety margin irrespective of the focal length.

The CPU 232 determines whether the current aperture diameter A is smaller than the maximum iris aperture diameter Af (Step S267). If the current aperture diameter A is greater than the maximum iris aperture diameter Af, the zoom speed of the zoom lens is set to a normal speed (Step S269). On the other hand, if the CPU 232 determines in Step S267 that the current aperture diameter A is equal to or greater than the maximum iris aperture diameter Af, the zoom speed of the zoom lens is set to a countermeasure speed (Step S268). After that, the process returns to Step S264.

The manner of setting of the normal speed and the countermeasure speed will be described below. FIG. 9 is a table showing the set values of the normal speed and those of the countermeasure speed. By way of example, in the shown table, the setting of the zoom speed of the image pickup apparatus ranges over four speeds, i.e., from the lowest speed for the first step of depression of the zoom switch 233 to the highest speed for the second step of depression of the zoom switch 233, according to the amount of depression of the zoom switch 233. For example, when the zoom switch 233 is depressed to the fourth step, the normal speed is set to a zoom speed of two seconds, but the countermeasure speed to be set under conditions which cause a conspicuous variation in marginal light quantity is set to a zoom speed of five seconds.

Incidentally, it is also possible to adopt an arrangement which prevents the current speed setting from varying during zooming if the opposite decision is made in Step S267 due to a variation in the state of illumination during the zooming and if the current zoom speed varies during the zooming and there is a possibility that the visual unnaturalness of an image increases during the zooming in spite of the same amount of depression of the zoom switch 233.

In the above-described manner, in the third embodiment, it is detected whether the aperture value of the iris is a value which causes a conspicuous variation in marginal light quantity, and according to the detection result, a zoom speed corresponding to a particular amount of depression of the zoom switch 233 is varied relative to the same, whereby it is possible to make a variation in marginal light quantity inconspicuous, in spite of the same amount of depression of the zoom switch 233.

[Fourth Embodiment]

The fourth embodiment is intended for an image pickup apparatus having a plurality of zoom switches, for example, a zoom manipulation ring which is fitted on a lens barrel for rotation about the optical axis thereof, a switch for effecting zooming according to the direction and speed of rotation of the zoom manipulation ring, and a seesaw switch disposed near a grip portion of the image pickup apparatus. In the fourth embodiment, different maximum zoom speeds can be realized by the manipulation of the respective switches, and a maximum zoom speed assigned to at least either one of the zoom switches is selected so that a variation in marginal light quantity can be made inconspicuous.

For example, the previously-described normal speed and countermeasure speed shown in FIG. 9 may be assigned to the seesaw switch and the zoom manipulation ring, respectively. Accordingly, a user can selectively manipulate both switches to avoid the occurrence of visual unnaturalness due to a variation in marginal light quantity.

As described above, in accordance with the fourth embodiment, an image pickup apparatus having zoom switches at two or more locations is arranged to enable different maximum zoom speeds to be set by the manipulation of the respective zoom switches, and a maximum zoom speed which can be set by the manipulation of at least one of the zoom switches is selected so that a variation in marginal light quantity can be made inconspicuous.

[Fifth Embodiment]

The fifth embodiment is intended for an image pickup apparatus having a camera body to which a lens is interchangeably secured. A plurality of interchangeable lenses are prepared, and in part of the lenses, a variation in marginal light quantity during high-speed zooming is conspicuous, whereas in the other lenses, such a large variation is not conspicuous.

Such an interchangeable-lens type of image pickup apparatus is arranged to detect, for example, the state of setting of a photographing mode and turn on or off variable control which varies its maximum iris aperture diameter according to focal lengths. If a lens of the type in which a variation in marginal light quantity is inconspicuous during zooming is secured to the image pickup apparatus, the image pickup apparatus does not need to perform such variable control.

In the fifth embodiment, to avoid such unnecessary control, information such as the state of mode setting, zoom speed, and the state of manipulation of a zoom switch, or information relative to the contrasts of a plurality of areas into which the entire picture is divided as will be described later in connection with the sixth embodiment, is communicated from the camera body of the image pickup apparatus to the lens thereof. The lens performs a predetermined operation on the basis of such information and, if the lens needs variable control, on the basis of information as to the camera body, which has been obtained through the communication.

Figure 10:
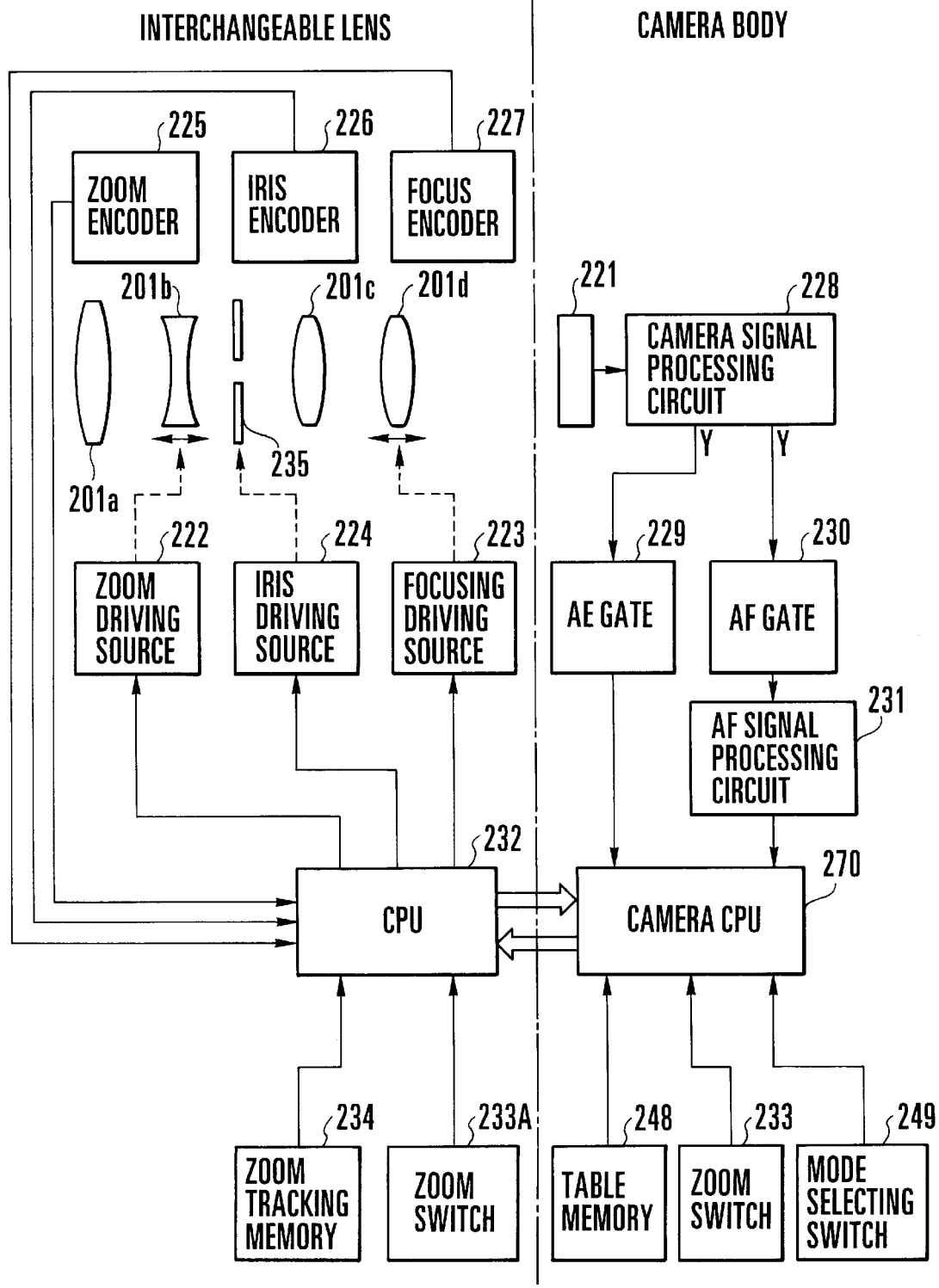
FIG. 10 is a block diagram showing the electrical construction of an image pickup apparatus according to a fifth embodiment of the present invention, which apparatus has a camera body to which a lens is interchangeably secured.

FIG. 10 is a block diagram showing the electrical construction of an image pickup apparatus according to the fifth embodiment, which apparatus has a camera body to which a lens is interchangeably secured. In FIG. 10, identical reference numerals are used to denote constituent elements identical to the corresponding ones used in the first embodiment (refer to FIG. 4).

In the construction, a camera-body CPU 270 transmits predetermined data to the CPU 232 of the lens via known electronic mount contacts at predetermined timing. The camera body has the zoom switch 233, and the lens has a zoom switch 233A.

In the fifth embodiment, since the camera body has the zoom switch 233 and the mode selecting switch 249, information indicative of the state of manipulation or setting of each of the switches 233 and 249 is communicated from the camera body to the lens, and the CPU 232 provided in the lens executes the required control. In this manner, only when an interchangeable lens in which a variation in marginal light quantity is conspicuous is used, it is possible to execute variable control which varies the maximum iris aperture diameter of the lens.

[Sixth Embodiment]

The phenomenon of a conspicuous variation in marginal light quantity which occurs during high-speed zooming becomes a problem, particularly in the case of a subject of uniform and low contrast. In the description of the first to fifth embodiments, reference has been made to various types of arrangements for turning on or off a countermeasure such as variable control over maximum iris aperture diameter or reduction in maximum zoom speed, on the basis of a decision condition such as the state of mode selection, zoom speed setting or the state of iris aperture.

The sixth embodiment makes use of the contrast of a subject as a decision condition, separately from the above-described decision condition on the basis of which it is determined whether to turn on the countermeasure. The former decision condition, i.e., the contrast of a subject, may also be used in combination with other decision conditions.

Figure 11:
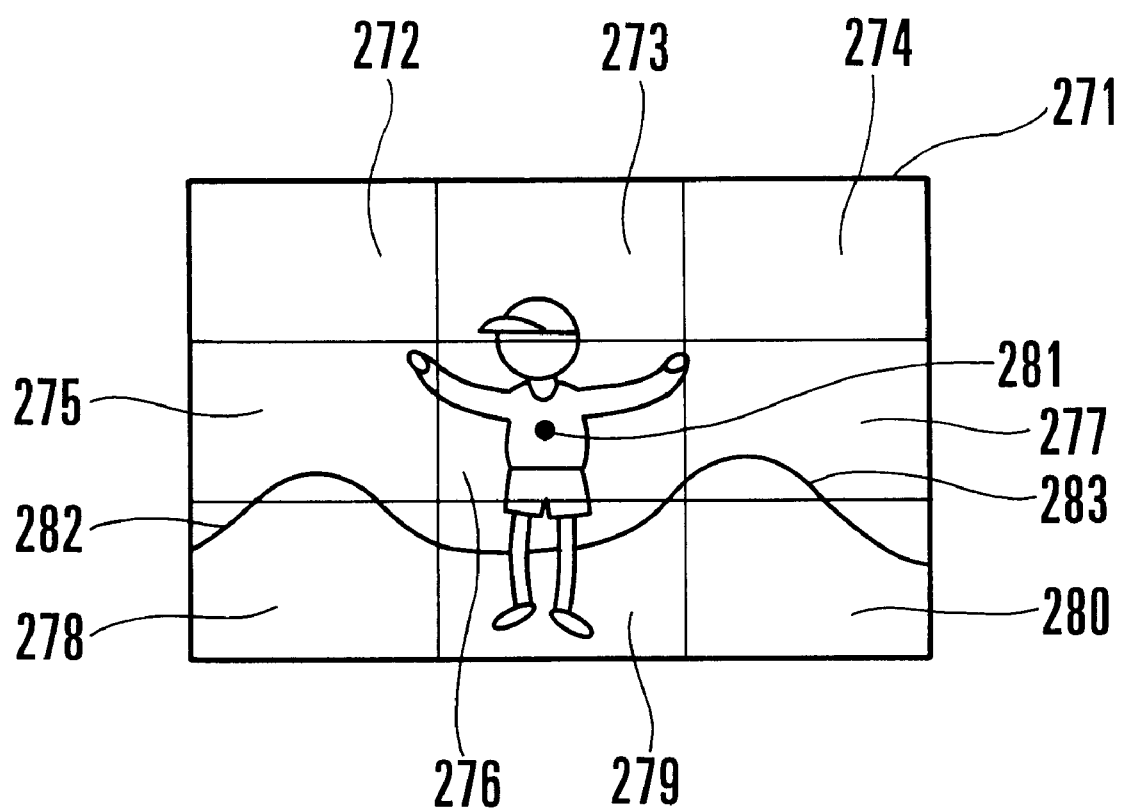
FIG. 11 is a view showing a picture photographed by an image pickup apparatus according to a sixth embodiment of the present invention.

FIG. 11 is a view showing a picture photographed by an image pickup apparatus according to the sixth embodiment. The entire picture 271 is divided into nine areas 272 to 280, and, for example, the area 276 may be set as an AF area and the areas 276 and 279 may be set as a light measuring (AE) area. The AF and AE areas may also be set as areas separately from the nine areas.

The areas 272 to 280 can be set by being sequentially switched over by the AF gate 230. Since the contrast of a subject, particularly, a high-frequency component is a signal obtainable from the AF signal processing circuit 231, the required decision may be made on the basis of an AF signal obtainable from each of the nine areas, or a contrast component may be detected from a predetermined spatial frequency area provided separately from an AF area.

In the sixth embodiment, a decision as to the above-described countermeasure is made on the basis of signals relative to the contrasts of the respective nine areas (in practice, the number of areas may be greater or smaller than nine), and the countermeasure such as variable control over maximum iris aperture diameter or reduction in maximum zoom speed is executed on the basis of the result of the decision.

There are various methods for such decision. For example, one method is to compare the sum of the contrast signals of all the nine areas with a predetermined value, and another method is to compare the sum of contrast signals of the corner areas 272, 274, 278 and 280 with a predetermined value.

Referring to FIG. 11, a person 281 who is a subject includes the areas 273, 276 and 279, a mountain which is a background lies in the areas 275, 278, 277 and 280, and the areas 272 and 274 are the sky which has a low contrast. For example, if the upper corner areas 272 and 274 have low contrasts, it may be necessary to execute an appropriate countermeasure.

Otherwise, instead of simply turning on or off one countermeasure on the basis of one decision condition, a plurality of countermeasures may also be combined according to the level of low contrast. Otherwise, one countermeasure may also be switched among a plurality of degrees, for example, the variable control over the maximum iris aperture diameter may be varied in an analog manner between the solid line 246 and the dot-dashed line 247 of FIG. 1, instead of being turned on or off as shown by these lines 246 and 247 in FIG. 1.

Figure 12:
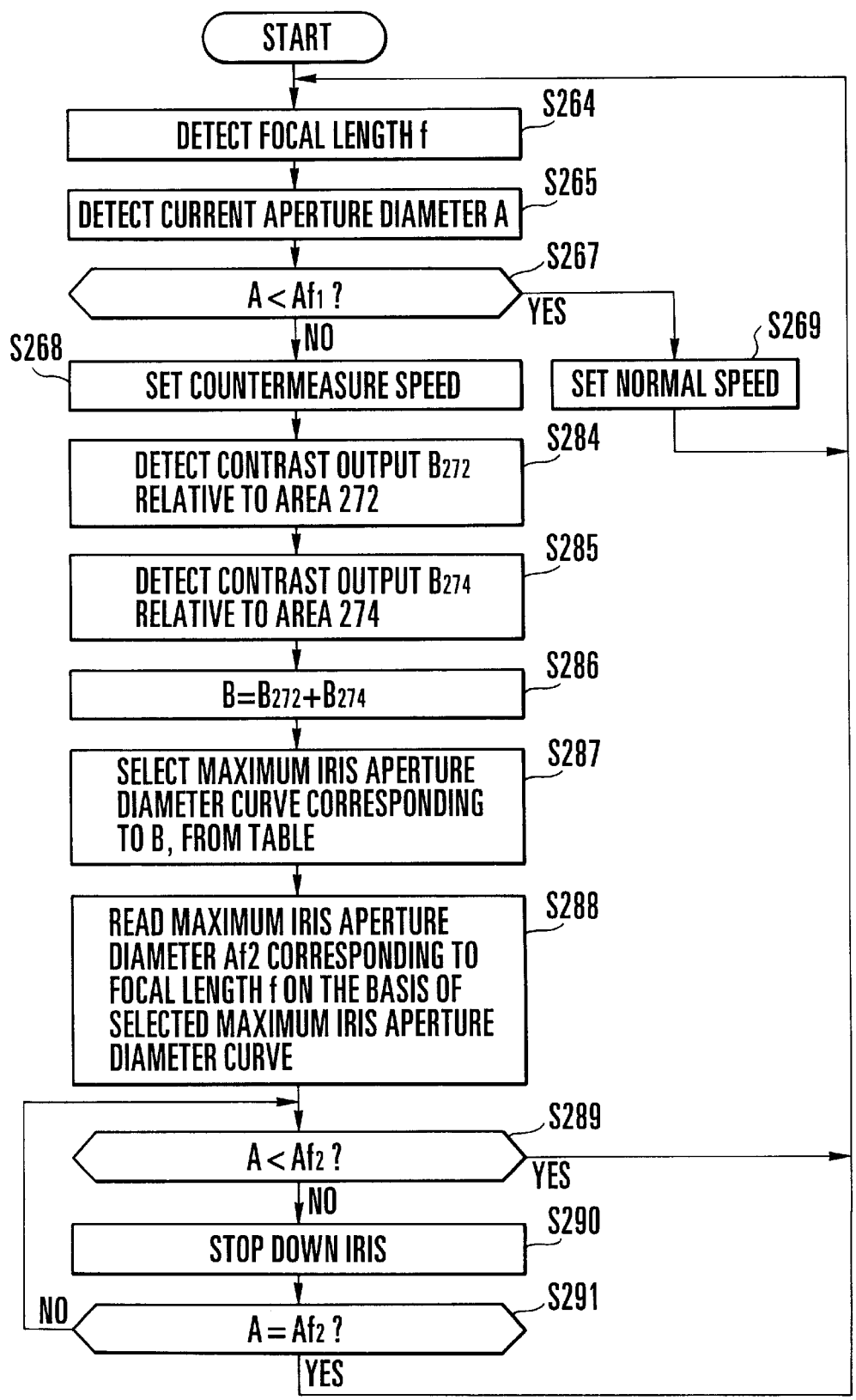
FIG. 12 is a flowchart showing a zoom control processing procedure in which a plurality of countermeasures are combined.

FIG. 12 is a flowchart showing a zoom control processing procedure in which a plurality of countermeasures are combined. Steps 264 to 269 are identical to the corresponding steps shown in FIG. 8. For example, if the aperture diameter A of the iris is smaller than an aperture diameter Af1 which is stopped down by approximately two steps from the fully open aperture, the zoom speed of the zoom lens of the image pickup apparatus is set to the normal speed, but if the aperture diameter A is equal to or greater than the aperture diameter Af1 (i.e., closer to the fully open aperture), the zoom speed of the zoom lens is set to the countermeasure speed in Step S268, in which the maximum zoom speed is reduced from a normal speed of two seconds to a countermeasure speed of five seconds so that the phenomenon of a variation in marginal light quantity can be made inconspicuous (refer to FIG. 9).

However, if a visually unnatural phenomenon cannot be prevented even with such a new zoom speed owing to a disadvantageous condition such as a low-contrast subject, the variable control which varies the maximum iris aperture diameter according to focal lengths is executed in Step S284 and the following steps.

First, in Step S284, information $B_{272}$ relative to the contrast of the top left corner area 272 of FIG. 11 is detected and read in. Then, in Step S285, information $B_{274}$ relative to the contrast of the top right corner area 274 of FIG. 11 is detected and read in. The information $B_{272}$ and the information $B_{274}$ are added together to obtain their sum B (Step S286), and a maximum iris aperture diameter curve is selected from a table according to the value of the obtained information B (Step S287).

Incidentally, in the sixth embodiment, if the value of the information B is above a predetermined level, the maximum iris aperture diameter curve shown by the solid line 246 of FIG. 1 is selected so that the variable control is not executed. If the value of the information B is below the predetermined level, the maximum iris aperture diameter curve shown by the dot-dashed line 247 of FIG. 1 is selected. In this case, it is also possible to adopt an arrangement capable of selecting one or more other maximum iris aperture diameter curves according to the value of the information B.

Then, a maximum iris aperture diameter Af2 for the focal length detected in Step S264 is obtained from the maximum iris aperture diameter curve selected in Step S287 (Step S288). In this flowchart, the relation between the aperture diameter Af1 and the maximum iris aperture diameter Af2 is Af1<Af2.

Then, it is determined that the current iris aperture diameter A is smaller than the maximum iris aperture diameter Af2 (Step S289). If the current iris aperture diameter A is equal to or greater than the maximum iris aperture diameter Af2, the iris is stopped down so that the current aperture diameter A and the maximum iris aperture diameter Af2 become equal to each other (Steps S290 and S291), whereby the iris aperture diameter can be prevented from becoming larger than that determined by the maximum iris aperture diameter curve.

In this manner, a zoom speed setting is varied according to an aperture value, and a maximum iris aperture diameter curve to be selected is changed according to the contrast component of a subject, from one maximum iris aperture diameter curve for variable control which varies the maximum iris aperture diameter according to different focal lengths to another maximum iris aperture diameter, so that a far more elaborate countermeasure can be executed. Incidentally, even in the sixth embodiment, it is desirable to adopt an arrangement which inhibits a selected maximum iris aperture diameter curve from being changed to another curve during zooming.

Accordingly, if a variation in marginal light quantity occurs against a background of a comparatively low-contrast subject such as the sky, the variable control which varies the maximum iris aperture diameter according to focal lengths is executed, but if the entire picture is occupied by a high-contrast subject, the variable control is not executed.

[Seventh Embodiment]

In the description of the third embodiment, reference has been made to the case where if an aperture value is under the condition that a variation in marginal light quantity is conspicuous, the contents of some zoom speed settings including a maximum zoom speed are changed as shown in FIG. 9. However, if the zoom speed is unconditionally changed to a low speed, another problem will occur; for example, rapid setting of an angle of view becomes difficult to ensure.

In view of this point, in the seventh embodiment, the zoom speed is not uniformly reduced irrespective of the position of the variator lens group, and, instead, the zoom speed is reduced in only a particular focal length range in which a variation in marginal light quantity becomes large, such as the range between the focal lengths M2 and M3 shown in FIG. 2.

Figure 13:
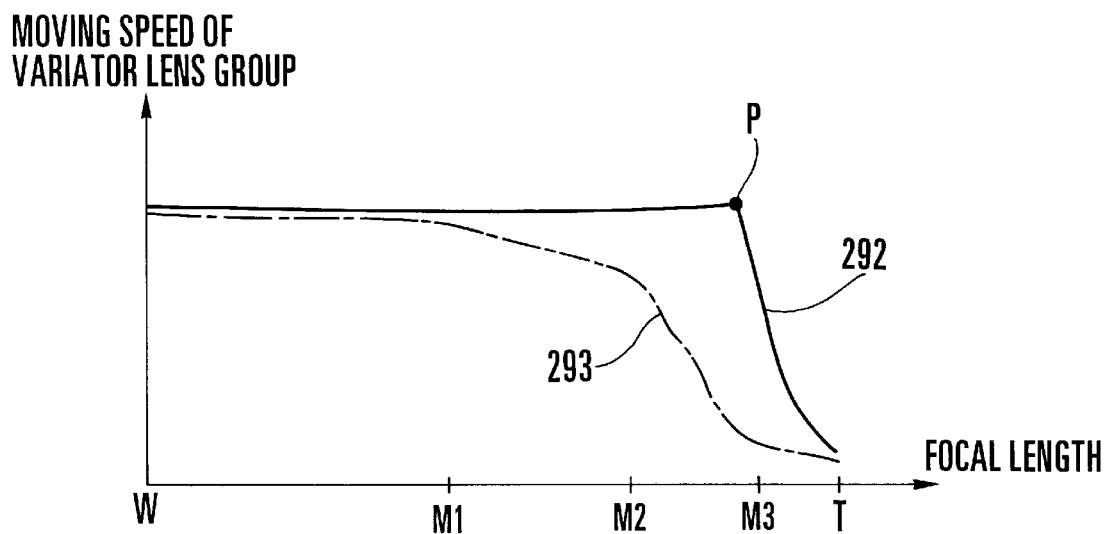
FIG. 13 is a graph showing the relation between the moving speed of a variator lens group and focal lengths according to a seventh embodiment of the present invention.

FIG. 13 is a graph showing the relation between the moving speed of the variator lens group and focal lengths in the seventh embodiment. In FIG. 13, the horizontal axis represents focal lengths, and the vertical axis represents the moving speed of the variator lens group which is zooming. A solid curve 292 represents a zoom speed curve to be used when the zoom switch 233 is depressed to the fourth step during the normal speed setting shown in FIG. 9

The reason why the solid curve 292 shows a reduction in the moving speed of the variator lens group on the T (telephoto) side of a point P is that it is necessary to correctly perform zoom tracking (a correction operation for maintaining the image forming position of the focusing lens group at a constant position during the movement of the variator lens group). Specifically, if the focusing lens group moves at the maximum speed which can be produced by the drive source for the focusing lens group, the zoom tracking is maintained by reducing the moving speed of the variator lens group.

In a currently popular arrangement in which both a variator lens group and a focusing lens group are driven by stepping motors, this method is generally practised so that the variator lens group can be driven at its maximum zoom speed by the stepping motor without causing an out-of-step operation.

If a linear actuator which can generally effect higher-speed driving than a stepping motor is used as the drive source for the focusing lens group, the speed reduction on the T side of the point P may not be needed.

A dot-dashed curve 293 represents the operation of setting the moving speed of the variator lens group to a counter-measure speed for the purpose of making a variation in marginal light quantity inconspicuous, relative to the solid curve 292 for the normal speed setting. As shown by the dot-dashed curve 293, the moving speed of the variator lens group is varied slowly over the range between the focal lengths M1 and M2 in which a moderate variation in marginal light quantity occurs, and rapidly in the range between the focal lengths M2 and M3 in which a large variation in marginal light quantity occurs. Accordingly, it is possible to make a variation in marginal light quantity inconspicuous.

There is no difference in the moving speed of the variator lens group between the solid curve 292 and the dot-dashed curve 293 in the range between a focal length W (wide-angle end) and the focal length M1. From this fact, it is possible to reduce visual unnaturalness due to a variation in marginal light quantity by reducing the maximum zoom speed (the fourth step) from two seconds to a zoom speed of as slow as approximately three seconds, instead of from two seconds to five seconds as shown in FIG. 9.

Thus, in the seventh embodiment, it is possible to ensure rapid setting of an angle of view by setting the moving speed of the variator lens group to a slower speed in a particular focal length range in which a variation in marginal light quantity is conspicuous, than in the other focal length range.

[Eighth Embodiment]

When the variable control over the maximum iris aperture diameter which has been described previously in connection with the first, second, fifth and sixth embodiments, if the response of the iris unit of an image pickup apparatus is slow, there is a possibility that an aperture diameter larger than a predetermined maximum aperture diameter may be set as the result of a tracking delay due to a time delay.

In this case, for example, in the flowchart shown in FIG. 12, a negative decision is always made in Step S289. In addition, without an affirmative decision being made in Step S291, the zoom control may be brought to an end.

Figure 14:
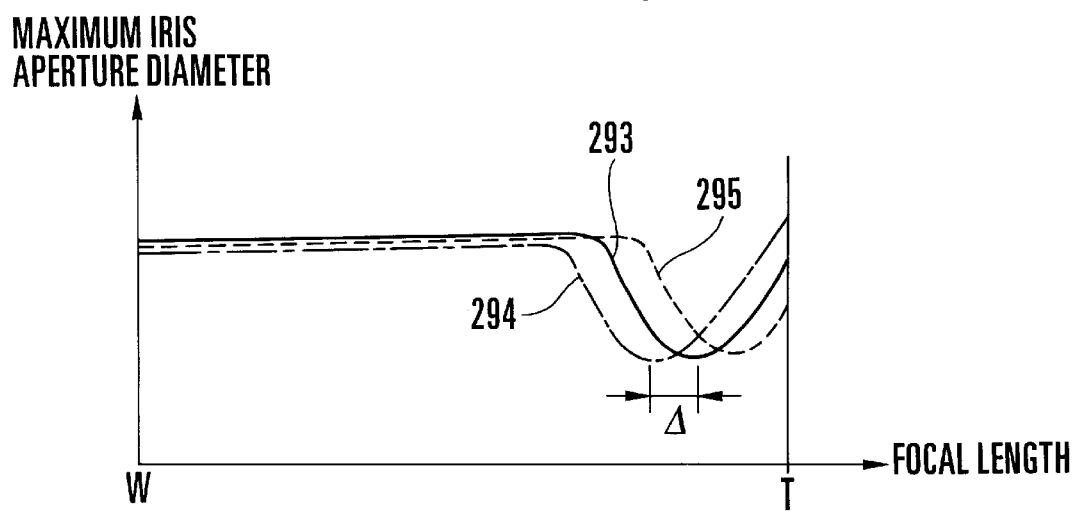
FIG. 14 is a graph showing the relation between maximum iris aperture diameter and focal length.
Figure 15:
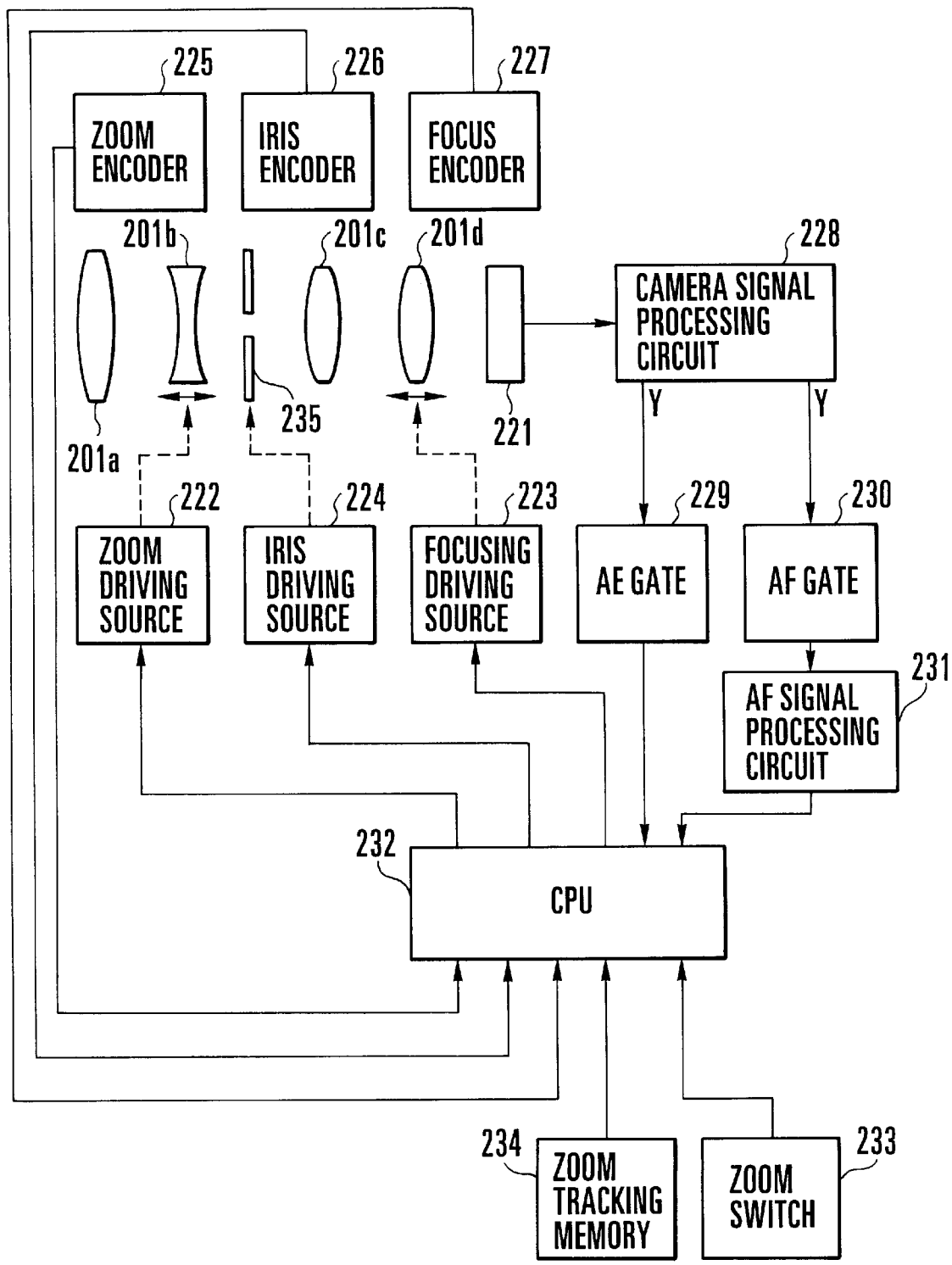
FIG. 15 is a block diagram showing the electrical construction of the camera body of a conventional image pickup apparatus.
Figure 16:
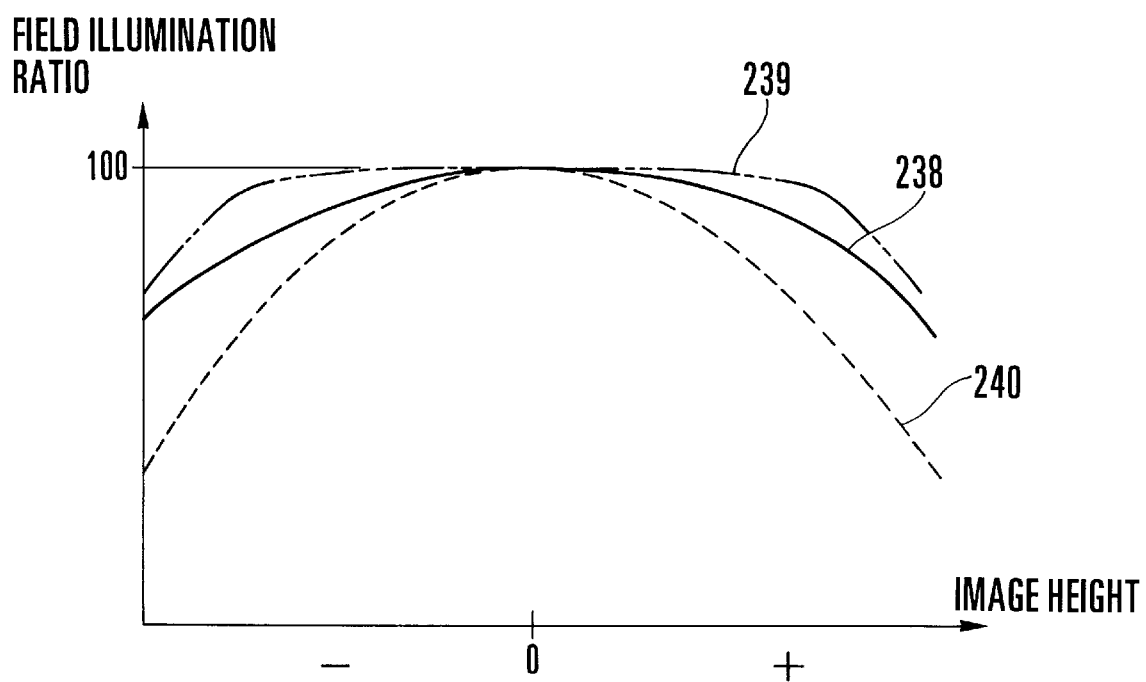
FIG. 16 is a graph showing the field illumination ratio of a zoom lens.

The eighth embodiment provides an arrangement which detects the direction of zooming and varies a target value to reduce the aforesaid delay according to the detection result. FIG. 14 is a graph showing the relation between maximum iris aperture diameter and focal length.

A solid line 293 represents a maximum iris aperture diameter curve having the same target values as the dot-dashed line 247 shown in FIG. 1. If the solid line 293 is shifted by a tracking delay A toward a target position represented by a dot-dashed line 294 during zooming from the wide-angle (W) end toward the telephoto (T) end, or toward another target position represented by a dotted line 295 during zooming from the telephoto end toward the wide-angle end, i.e., if the maximum iris aperture diameter curve is set to take the response delay of the iris into account according to the direction of zooming, it is in practice possible to realize an iris operation which approximately tracks the target position represented by the solid curve 293. Incidentally, the amount of the tracking delay A may also be varied according to zooming speed settings.

In this manner, in the eighth embodiment, the response delay of the variable control over the maximum iris aperture diameter is taken into account according to focal lengths, and the target position of the maximum iris aperture diameter curve according to focal lengths is made variable according to the direction of zooming (whether to execute zooming from a shorter focal length toward a longer focal length or zooming in the opposite direction), whereby optimum variable control can be exerted over the maximum iris aperture diameter.

Incidentally, in practice, the zoom control operations of the respective embodiments can be selectively combined. In each of the embodiments, it is also possible to adopt an arrangement in which the zoom control operation is executed during only recording, but is not executed during a recording wait state.

Furthermore, as a matter of course, the present invention can be applied to a case in which the present invention can be achieved by providing a program to an apparatus. In this case, the apparatus can enjoy the effects of the present invention by reading data from a storage medium which stores a program represented by the software required for achieving the present invention. The storage medium may be not only a ROM but also a nonvolatile memory card or the like.

As is apparent from the foregoing description, when zooming is to be executed by moving a lens in the direction of the optical axis thereof, a moving speed of the lens is set by speed setting means, and a maximum iris aperture diameter of an iris which is determined for each focal length is varied according to the set moving speed by maximum aperture diameter varying means. Accordingly, if there is a possibility that the zoom speed which is set for the zooming causes a conspicuous variation in marginal light quantity due to a variation in focal length during the zooming and produces visual unnaturalness, variable control which varies the maximum iris aperture diameter according to focal lengths is executed, whereby the visual unnaturalness can be reduced.

For example, when a zoom switch is manipulated, a zoom speed which is determined by the amount of depression of the zoom switch is detected, and if the detected zoom speed corresponds to a speed setting which causes a conspicuous variation in marginal light quantity, the maximum iris aperture diameter is limited so that the variation can be made inconspicuous. Specifically, the maximum iris aperture diameter is limited on the basis of table data or the like which is set in a CPU, according to focal lengths (position information relative to a variator lens group).

Thus, if high-speed zooming is executed with an aperture value which causes a large variation in field illumination ratio, it is possible to avoid the problem that a variation in the brightness of the edge portion of a picture becomes conspicuous to produce visual unnaturalness.

In addition, when zooming is to be executed by moving a lens in the direction of the optical axis thereof, one mode is selected from among a plurality of modes for respectively setting different aperture values with respect to a brightness of a subject to be photographed, by mode selecting means, and a maximum iris aperture diameter of an iris which is determined for each focal length is varied according to the selected mode by maximum aperture diameter varying means. Accordingly, since whether to execute variable control over the maximum aperture diameter is determined according to the state of selection from the modes provided in an image pickup apparatus, it is possible to allow a user to select at his/her intention a mode which can eliminate visual unnaturalness due to a variation in marginal light quantity and a mode which can defocus bright spots or the like in a background to form circular soft spot images.

For example, either one of a mode which executes variable control over the maximum iris aperture diameter according to focal lengths and a mode which does not execute such variable control is selected. Specifically, if a fully open aperture is fixed during an aperture-priority AE mode, the variable control is turned off. Accordingly, a photographer who desires to make background spot images circular can realize his/her photographic intention by selecting the aperture-priority AE mode and setting the fully open aperture.

In addition, in a case where a moving speed of a lens is set by a manipulation when zooming is to be executed by moving a lens in the direction of the optical axis thereof, an aperture value of the lens is detected by aperture value detecting means, and the moving speed of the lens which is set by the manipulation is varied according to the detected aperture value by moving-speed varying means. Accordingly, it is possible to prevent a zoom operation accompanied by visual unnaturalness, by detecting whether the aperture value is under conditions which cause a conspicuous variation in marginal light quantity, and varying the contents of zoom speed settings according to the detection result.

For example, it is detected whether the current aperture value is a value which causes a conspicuous variation in marginal light quantity, and a corresponding zoom speed is varied in spite of the same amount of depression of a zoom switch.

In addition, when zooming is to be executed by moving a lens in the direction of the optical axis thereof, moving speeds of the lens which are set by a manipulation of a plurality of zoom manipulating means to be manipulated by an operator are respectively set to different maximum values by maximum speed setting means. The image pickup apparatus has a total of two or more zoom manipulating means, and a maximum zoom speed which is set by at least one of the zoom manipulating means serves as a speed setting which can prevent visual unnaturalness from accompanying a variation in marginal light quantity. Accordingly, a user can eliminate visual unnaturalness during zooming by selectively using such zoom manipulating means.

In addition, in an image pickup apparatus which has a camera body to which a lens unit can be interchangeably secured, the lens unit being arranged to effect zooming by moving a lens in the direction of the optical axis thereof, information which is set or selected by the camera body is communicated to the lens unit by communication means. Accordingly, the present invention can also be applied to an interchangeable-lens type of image pickup apparatus by using an arrangement in which predetermined information such as information for determining whether to execute variable control over a maximum aperture diameter is communicated from the camera body to the lens unit via an electronic mount or the like and such information is identified by a CPU provided in the lens unit.

For example, in a case where a zoom switch and a mode switch are provided on the camera body, the state of manipulation setting is communicated from the camera body to the lens unit, and control is executed by the CPU provided in the lens unit. Thus, only in the case of an interchangeable lens in which a variation in marginal light quantity during zooming is conspicuous, variable control can be exerted over the maximum iris aperture diameter.

In addition, when a subject is to be photographed within a picture while zooming is being executed by moving a lens in the direction of the optical axis thereof, the picture is divided into a plurality of areas by picture dividing means, and the contrasts of the respective areas are detected by detecting means and a maximum aperture diameter of an iris which is determined for each focal length is varied on the basis of the detected contrasts by maximum aperture diameter varying means. Accordingly, it can be determined whether a variation in marginal light quantity is conspicuous, on the basis of contrast information relative to an area other than a central portion of the picture, and variable control over the maximum iris aperture diameter or a zoom speed can be varied according to the decision result.

For example, in the case of a comparatively low-contrast subject such as the sky, the variable control which varies the maximum iris aperture diameter according to focal lengths is executed, but if the entire picture is occupied by a high-contrast subject, the variable control is not executed.

In addition, in a particular focal length range, the moving speed of the lens which is varied according to the aperture value has the same value as the moving speed which is not varied. Accordingly, for example, in reducing a zoom speed, it is possible to reduce the zoom speed in only a focal length range in which a variation in marginal light quantity is conspicuous, instead of unconditionally reducing the zoom speed over the entire zoom range. Accordingly, it is possible to set countermeasure speeds to zoom speeds which are not much slower than normal speeds.

For example, by setting the moving speed of a variator lens group to a slower speed in a particular focal length range in which a variation in marginal light quantity is conspicuous, than in the other focal length range, it is possible to ensure rapid setting of an angle of view while making the phenomenon of a variation in marginal light quantity inconspicuous.

Since the maximum aperture diameter of the iris for each focal length is set while taking the response delay of the iris into account according to the direction of zooming, the setting of target values of the maximum aperture diameter of the iris according to focal lengths is made variable according to the direction of zooming, whereby it is possible to execute control which can realize an actual iris operation approximately coincident with a target value while taking a delay of response time into account.

For example, the response delay of the variable control over the maximum iris aperture diameter is taken into account according to focal lengths, and the setting of target positions of the maximum iris aperture diameter according to focal lengths is made variable according to the direction of zooming (whether to execute zooming from a shorter focal length toward a longer focal length or zooming in the opposite direction), whereby optimum variable control can be exerted over the maximum iris aperture diameter.

I claim:

1. A lens control device which is arranged to execute zooming by moving a lens in the direction of an optical axis thereof, comprising:

speed setting means for setting a moving speed of the lens; and maximum aperture diameter varying means for varying a maximum aperture diameter of an iris which is determined for each focal length, according to the moving speed set by said speed setting means.

2. A lens control device which is arranged to execute zooming by moving a lens in the direction of an optical axis thereof, comprising:

mode selecting means for selecting one mode from among a plurality of modes for respectively setting different aperture values with respect to a brightness of a subject to be photographed; and maximum aperture diameter varying means for varying a maximum aperture diameter of an iris which is determined for each focal length, according to the mode selected by said mode selecting means.

3. A lens control device which is arranged to allow a moving speed of a lens to be set by a manipulation when executing zooming by moving the lens in the direction of an optical axis thereof, comprising:

aperture value detecting means for detecting an aperture value of the lens; and moving speed varying means for varying the moving speed of the lens which is set by the manipulation, according to the aperture value detected by said aperture value detecting means.

4. A lens control device which is arranged to execute zooming by moving a lens in the direction of an optical axis thereof, comprising:

a plurality of zoom manipulating means to be manipulated by an operator; and maximum speed setting means for setting moving speeds of the lens which are set by a manipulation of said plurality of zoom manipulating means to different maximum values, respectively.

5. A lens control device according to claim 1, 2 or 3, further comprising:

a camera body to which the lens is interchangeably secured; and communication means for communicating information which is set or selected by said camera body to the lens.

6. A lens control device which is arranged to allow a subject to be photographed within a picture while zooming is being executed by moving a lens in the direction of an optical axis thereof, comprising:

picture dividing means for dividing the picture into a plurality of areas;

detecting means for detecting contrasts of the plurality of areas; and maximum aperture diameter varying means for varying a maximum aperture diameter of an iris which is determined for each focal length, on the basis of the contrasts detected by said detecting means.

7. A lens control device according to claim 3, wherein, in a particular focal length range, the moving speed of the lens which is varied according to the aperture value has the same value as the moving speed which is not varied.

8. A lens control device according to claim 1, 2 or 6, wherein the maximum aperture diameter of the iris which is determined for each focal length is set while taking a response delay of the iris into account according to a direction of the zooming.

9. A lens control method for executing zooming by moving a lens in the direction of an optical axis thereof, comprising the steps of:

setting a moving speed of the lens; and varying a maximum aperture diameter of an iris which is determined for each focal length, according to the moving speed set by said setting step.

10. A lens control method for executing zooming by moving a lens in the direction of an optical axis thereof, comprising the steps of:

selecting one mode from among a plurality of modes for respectively setting different aperture values with respect to a brightness of a subject to be photographed; and varying a maximum aperture diameter of an iris which is determined for each focal length, according to the mode selected by said selecting step.

11. A lens control method which allows a moving speed of a lens to be set by a manipulation when executing zooming by moving the lens in the direction of an optical axis thereof, comprising the step of:

detecting an aperture value of the lens; and varying the moving speed of the lens which is set by the manipulation, according to the aperture value detected by said detecting step.

12. A lens control method for executing zooming by moving a lens in the direction of an optical axis thereof, comprising the step of:

setting moving speeds of the lens which are set by a manipulation of a plurality of zoom manipulating parts to be manipulated by an operator, to different maximum values, respectively.

13. A lens control method which allows a subject to be photographed within a picture while zooming is being executed by moving a lens in the direction of an optical axis thereof, comprising the steps of:

dividing the picture into a plurality of areas;

detecting contrasts of the plurality of areas; and varying a maximum aperture diameter of an iris which is determined for each focal length, on the basis of the contrasts detected by said detecting step.

14. A lens control method according to claim 11, wherein, in a particular focal length range, the moving speed of the lens which is varied according to the aperture value has the same value as the moving speed which is not varied.

15. A lens control method according to claim 9, 10 or 13, wherein the maximum aperture diameter of the iris which is determined for each focal length is set while taking a response delay of the iris into account according to a direction of the zooming.

* * * * *

UNITED STATES PATENT AND TRADEMARK OFFICE
CERTIFICATE OF CORRECTION

PATENT NO. : 6,070,016  
DATED : May 30, 2000  
INVENTOR(S) : Naoya Kaneda

Page 1 of 1

It is certified that error appears in the above-identified patent and that said Letters Patent is hereby corrected as shown below:

<u>Column 16,</u>
Line 22, and 32, delete "delay A" and insert -- delay $\Delta$ --.

Signed and Sealed this

Twenty-eighth Day of August, 2001

Attest:

NICHOLAS P. GODICI  
*Attesting Officer*  *Acting Director of the United States Patent and Trademark Office*